United States Patent
Poole et al.

(10) Patent No.: US 11,829,559 B2
(45) Date of Patent: Nov. 28, 2023

(54) FACILITATING INTERACTIONS ON A MOBILE DEVICE INTERFACE BASED ON A CAPTURED IMAGE

(71) Applicant: International Business Machines Corporation, Armonk, NY (US)

(72) Inventors: Christopher John Poole, Romsey (GB); Mark Andrew Woolley, Winchester (GB); Joseph Peter Kent, Stockbridge (GB); Thomas James Waterton, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 17/460,143

(22) Filed: Aug. 27, 2021

(65) Prior Publication Data

US 2023/0061708 A1    Mar. 2, 2023

(51) Int. Cl.
*G06F 3/041* (2006.01)
*G06T 7/00* (2017.01)
*G06T 7/20* (2017.01)

(52) U.S. Cl.
CPC ............ *G06F 3/04186* (2019.05); *G06T 7/20* (2013.01); *G06T 7/97* (2017.01); *G06T 2207/10016* (2013.01)

(58) Field of Classification Search
None
See application file for complete search history.

(56) References Cited

U.S. PATENT DOCUMENTS

| 9,280,234 | B1 * | 3/2016 | Froment | G06F 3/041 |
| 10,077,110 | B2 * | 9/2018 | Erickson | A61B 5/4082 |
| 10,318,574 | B1 * | 6/2019 | Bonechi | G06F 16/447 |
| 10,686,983 | B1 * | 6/2020 | Agarwal | H04N 23/64 |
| 2006/0036948 | A1 * | 2/2006 | Matsuzaka | G11B 27/28 715/723 |
| 2008/0055259 | A1 * | 3/2008 | Plocher | G06F 3/04886 345/173 |
| 2008/0174663 | A1 * | 7/2008 | Iwabuchi | H04N 23/68 386/E5.072 |

(Continued)

FOREIGN PATENT DOCUMENTS

| CN | 105701806 A | 8/2018 |
| WO | 2017037487 A1 | 3/2017 |

OTHER PUBLICATIONS

Badaway, "Detecting Parkinson's Disease with Your Mobile Phone," womenareboring, Oct. 6, 2016, 6 pages. <https://womenareboring.wordpress.com/2016/10/06/detecting-parkinsons-disease-with-your-mobile-phone/>.
Battiti et al., "Predicting Parkinson's Disease with Smartphone Data," The Michael J. Fox Foundation for Parkinson's Research, accessed May 26, 2021, 4 pages. < https://www.michaeljfox.org/grant/predicting-parkinsons-disease-smartphone-data>.

(Continued)

*Primary Examiner* — Mandrita Brahmachari
(74) *Attorney, Agent, or Firm* — Jared C. Chaney

(57) ABSTRACT

A computer system may modify the user interactions by receiving, by a computer system, a sequence of image frames in a time period, from a camera application on a mobile device, wherein the time period starts before and ends after a shutter is activated on the camera application; monitoring, by a computer system, movement of the mobile device within the time period; calculating a movement score for a user of the mobile device, by analyzing the sequence of image frames and the movement of the mobile device; and using the movement score to modify the user's interaction with the mobile device interface.

19 Claims, 10 Drawing Sheets

(56) References Cited

U.S. PATENT DOCUMENTS

| | | | |
|---|---|---|---|
| 2008/0288883 A1* | 11/2008 | Pagan | G06F 3/0481 715/764 |
| 2009/0164069 A1* | 6/2009 | Yanagisawa | B60K 28/063 701/45 |
| 2010/0076348 A1* | 3/2010 | McNames | A61B 5/11 600/595 |
| 2010/0146444 A1* | 6/2010 | Wang | G06F 3/017 715/815 |
| 2012/0019687 A1* | 1/2012 | Razavi | H04N 25/42 348/231.6 |
| 2012/0081551 A1* | 4/2012 | Mizuno | H04N 7/181 348/150 |
| 2013/0038746 A1* | 2/2013 | Hosokawa | H04N 23/63 348/E5.043 |
| 2013/0057713 A1* | 3/2013 | Khawand | H04N 23/80 348/208.1 |
| 2015/0100141 A1* | 4/2015 | Hughes | G06Q 10/0639 700/92 |
| 2016/0241784 A1* | 8/2016 | Baek | H04N 23/632 |
| 2019/0254522 A1* | 8/2019 | Brancaccio | G16H 20/30 |
| 2019/0294888 A1* | 9/2019 | Jones | G06V 10/772 |
| 2019/0388011 A1* | 12/2019 | Johnson | A61B 5/1118 |
| 2020/0060602 A1* | 2/2020 | Wagner | A61B 5/1123 |
| 2020/0374386 A1* | 11/2020 | Xu | G06F 3/0346 |
| 2021/0275087 A1* | 9/2021 | Huang | A61B 5/0205 |
| 2023/0128106 A1* | 4/2023 | Otsuka | G06T 3/4053 382/299 |

OTHER PUBLICATIONS

Costello, "Everything You Need to Know About iPhone Live Photos," Lifewire, Dec. 26, 2020, 17 pages. <https://www.lifewire.com/iphone-live-photos-1999618>.

Lan et al., "Early Diagnosis of Parkinson's Disease Using a Smartphone," The 11th International Conference on Mobile Systems and Pervasive Computing (MobiSPC-2014), Procedia Computer Science 34 , Dec. 2014, pp. 305-312.

Mas et al., "Image Based Subpixel Techniques for Movement and Vibration Tracking," 11th European Conference on Non-Destructive Testing (ECNDT 2014), Oct. 6-10, 2014, 8 pages. <https://www.ndt.net/events/ECNDT2014/app/content/Paper/322_Espinosa_Rev2.pdf>.

Mell et al., "The NIST Definition of Cloud Computing," Recommendations of the National Institute of Standards and Technology, U.S. Department of Commerce, Special Publication 800-145, Sep. 2011, 7 pages.

Rice, "Pixel-Shift Shootout: Olympus vs. Pentax vs. Sony vs. Panasonic," B&H, accessed May 26, 2021, 11 pages. <https://www.bhphotovideo.com/explora/photography/tips-and-solutions/pixel-shift-shootout-olympus-vs-pentax-vs-sony-vs-panasonic>.

Silva De Lima et al., "Feasibility of large-scale deployment of multiple wearable sensors in Parkinson's disease" PLOS One, Dec. 20, 2017, 15 pages. <https://journals.plos.org/plosone/article?id=10.1371/journal. pone.0189161>.

* cited by examiner

FACILITATING INTERACTIONS ON A MOBILE DEVICE INTERFACE BASED ON A CAPTURED IMAGE

BACKGROUND

The present invention relates to mobile devices, in particular, to a method for modifying user interactions with mobile device interfaces.

Mobile devices, such as smartphones, tablets and smartwatches are used in the working and daily lives of many users. Many mobile devices have a touchscreen user interface through which users interact with applications on the mobile device.

A touchscreen user interface is an input and output device provided with an electronic visual display of a computing device. The user can use the touchscreen to react to what is displayed or control the computing device through simple or multi-touch gestures by touching the screen with a special stylus or one or more fingers.

A user can use a special stylus or one or more fingers to touch the touchscreen user interface, such that the application understands which part of the interface the user is attempting to interact with. For example, the interaction may be a single tap for pressing a button on a webpage. Another interaction may be a two-finger gesture, for zooming into an image on a photo application.

SUMMARY

Some embodiments of the present disclosure describe a method for modifying a user interaction on a mobile device, which allows the detection of impaired motor ability of the user as well as making modifications of the input interaction or the user interface, to help the user correctly interact with the mobile device.

An embodiment of the present disclosure provides a way to assess a potential onset of such motor impairment conditions through the use of mobile devices and interactions that most users operate on a regular basis; specifically, the taking of photos using a camera application on their smartphone. A movement score for the user for a given instance is calculated, by a computer system, to determine whether the user is deemed to have a motor impairment at a given instance. Additionally, by analyzing the movement scores over time, users can get an earlier diagnosis of the onset of a motor impairment condition. The present disclosure then uses the movement score to modify subsequent interactions with the mobile device such that the user is able to correctly interact with the mobile device through the touchscreen interface.

An embodiment of the present disclosure modifies the interaction with the mobile device by calibrating the user's interaction such that the correct user interface element is selected. Another embodiment of the disclosure modifies the interaction with the mobile device by detecting that there are multiple elements that the user may have intended to press and presenting alerts and checkpoints to the user, to make sure the correct element is processed. Another embodiment of the disclosure increases the sizes of the interactive elements on the interface while the computer system identifies that the user has a motor impairment.

Viewed from one aspect, the present disclosure provides a method for modifying a user interaction on a mobile device interface comprising: receiving, by a computer system, a sequence of image frames in a time period, from a camera application on a mobile device, wherein the time period starts before and ends after a shutter is pressed on the camera application; monitoring, by a computer system, movement of the mobile device within the time period; calculating a movement score for a user of the mobile device, by analyzing the sequence of image frames and the movement of the mobile device; and using the movement score to modify the user's interaction with the mobile device interface.

Viewed from another aspect, the present disclosure provides a computer program product for modifying a user interaction on a mobile device interface, the computer program product comprising: program instructions to receive, by a computer system, a sequence of image frames in a time period, from a camera application on a mobile device, wherein the time period starts before and ends after a shutter is pressed on the camera application; program instructions to monitor, by a computer system, movement of the mobile device within the time period; program instructions to calculate a movement score for a user of the mobile device, by analyzing the sequence of image frames and the movement of the mobile device; and program instructions to use the movement score to modify the user's interaction with the mobile device interface.

DESCRIPTION OF THE DRAWINGS

Embodiments of the present disclosure will now be described, by way of example only, with reference to the following figures.

DETAILED DESCRIPTION

Disclosed herein is a method and a computer program product for modifying a user interaction on a mobile device. Mobile devices are designed to be compact and small so the user can carry the mobile device around with them easily, as well as use the device in their hands without a problem. This means that the display sizes of the touchscreens are relatively small compared to the size of the fingers of some users, such that the interaction with the touchscreen needs to be precise in order to press the correct part of the application interface.

Users with good manual dexterity do not have an issue with touchscreens, unless they get shaken while attempting to press a specific part of the touchscreen or they press a different part of the touchscreen by accident.

Users with motor skill impairments or disorders may struggle to control the movements of their fingers and therefore have difficulties interacting with a mobile device touchscreen correctly. Users with Parkinson's disease, dyspraxia and other motor skill impairments often exhibit hand shaking symptoms which makes it difficult for them to press the correct button or area of the touchscreen, resulting in erroneous interactions. This can make it frustrating for such users to use a touchscreen, and they may opt to use an alternative input method, such as a mouse, keyboard or a speech-to-text system instead to interact with the mobile device.

It is beneficial to detect the onset of Parkinson's disease, and other similar motor impairment conditions as early as possible, so that the user can explore potential treatments. There are specific software applications and instruments that seek to do this, but they only help if a user thinks that they might have such a condition and proactively seeks out such diagnostic tools. Specialist tools also exist which require the user to perform specific actions (over and above their normal activity) to assess their condition. This can include opening the specific software application, holding their phone still for a given time period, and then assessing the accelerometer data to determine whether the user has a motor impairment.

There are also specialist aid solutions for helping users with such motor impairment conditions to interact with their devices. These solutions include the use of alternate input methods such as a mouse, keyboard or a speech-to-text system. Such alternative inputs are not always available as an option in many applications.

Further, the existing diagnosis tools and aid solutions rely on the user already having an awareness that there is a potential issue and acting proactively.

Figure 1:
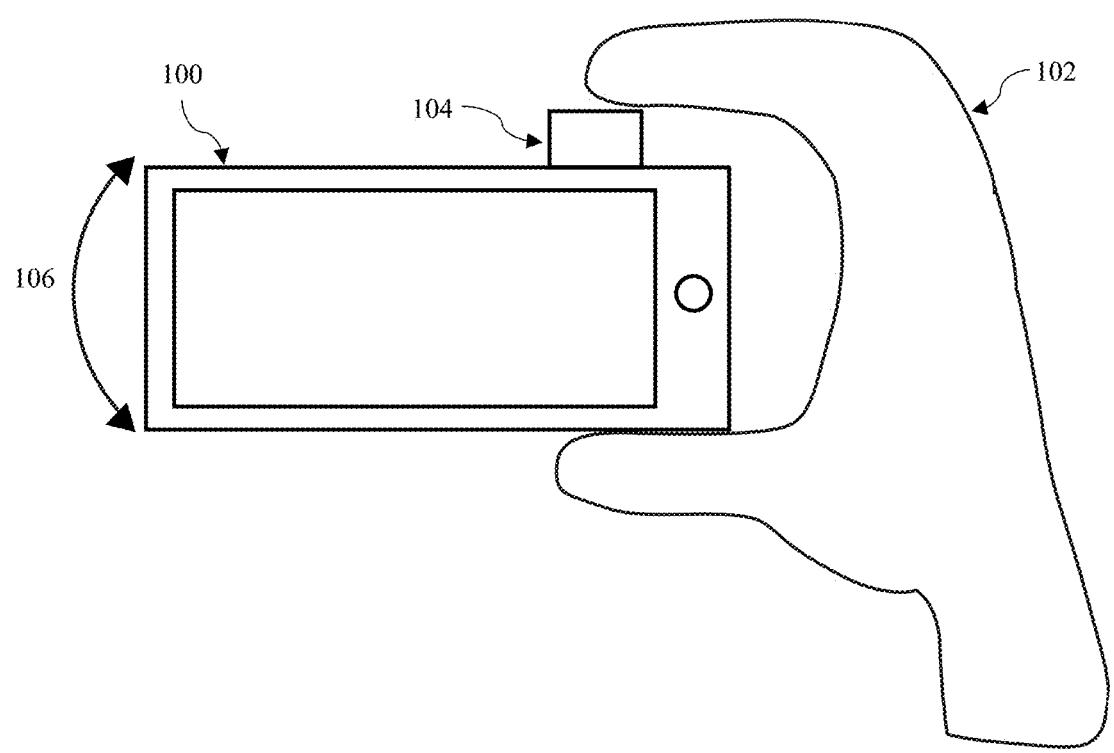
FIG. 1 is a schematic diagram of a camera application on a mobile device being used by a user.

In an embodiment of the present disclosure, the mobile device is a smart device (e.g., a smartphone) which is held in a user's hands while they are taking a photo. FIG. 1 shows a mobile device 100 (e.g., a mobile device), being held by a user's hand 102 as the user's hand is pressing a shutter button 104. The user has a motor impairment that impacts their hands, such that there is a movement 106 (e.g., a shaking, jerking, etc.) in the mobile device while the user takes the photo. The shutter 104 in this embodiment is a physical button on the mobile device 100. Other shutter buttons may be a virtual button on the user interface of the camera application, or the shutter can be triggered by a speech-to-text system, such that a user may activate this shutter (whether a virtual button, a voice activated functionality, or the like) to cause the mobile device 100 to capture the photo. Though for purposes of clarity a physical shutter that can be pressed is discussed herein, it is to be understood that a shutter as discussed herein includes any mechanism that is user-activated to cause a mobile device to take one or more pictures.

Some embodiments of the present disclosure gather data over a time period that includes the shutter being pressed to calculate a movement score for the user, since users normally attempt to keep the mobile device as still as possible when taking photos on their smartphone. In some embodiments, the time period may be a predetermined time period. For example, 3 seconds before a shutter activation and 3 seconds after a shutter activation. This means that the detection of additional movement of the mobile device during the time period can be attributed to involuntary hand movements of the user, as opposed to an intentional movement by the user. The detection of additional movement, in embodiments of the present disclosure, is calculated using a sequence of images taken in the time period that includes the shutter being pressed, alongside movement data of the mobile device monitored during the time period. In some examples, this time period may be of a predetermined duration (e.g., one second before the shutter is pressed and one second after the shutter is pressed), and/or the time period may be intrinsically linked to usage of a camera (e.g., the period during which the camera application of the mobile device 100 is open).

Figure 2:
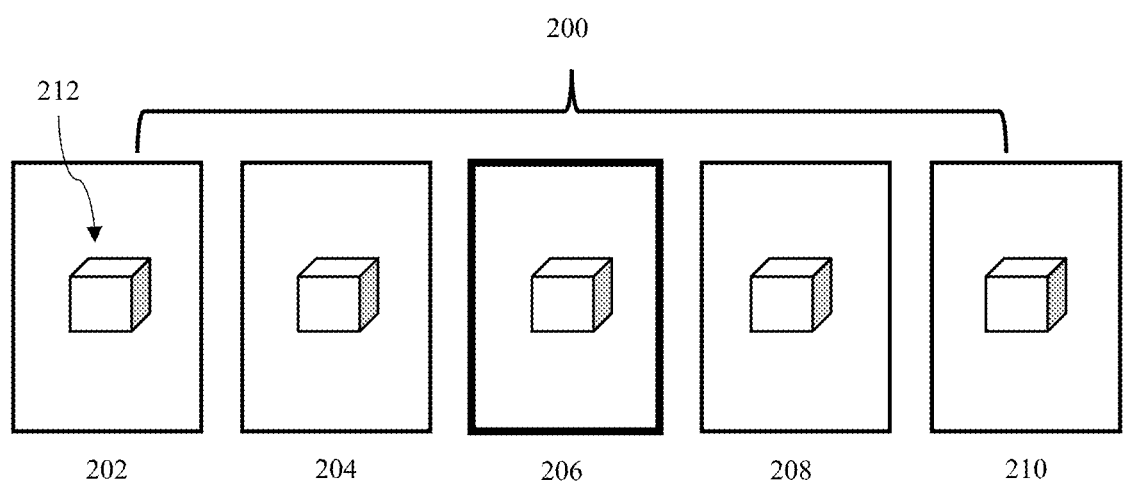
FIG. 2 shows a sequence of image frames taken by the camera application within a time period.

FIG. 2 illustrates a sequence of images 200 received by a computer system in a time period, from a camera application on a mobile device, wherein the time period starts before and ends after a shutter (e.g., a button to take the picture, such as shutter button 104 in FIG. 1) is pressed on the camera application. According to an example embodiment of the disclosure, the time period starts 1 second before and ends 1 second after the shutter is pressed on the camera application, wherein an image is taken every 0.5 seconds. This results in a collection of the sequence of 5 images; two images 202, 204 are taken before the main image 206, and two images 208, 210 are received after main image 206. In some embodiments, the 202-210 may have an object 212. In some embodiments, the object may be used to determine a movement of the camera. The person skilled in the art will appreciate that the time period and the number of images in the collection of the sequence of images can be increased depending on memory capacity and the processing power of the computing system.

The collection of sequential images can be done by continuously taking images through the camera application and temporarily caching the images in a computer system as soon as the user opens the camera application, in anticipation of a shutter being pressed. Once the user presses the shutter, the images received before and after the shutter press, in the time period, are retrieved and are received by the computer program.

Figure 3A:
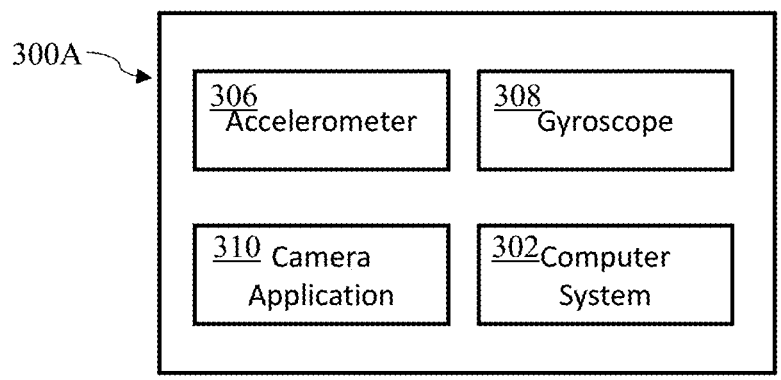
FIGS. 3A and 3B are schematic diagrams of the hardware and software components of the mobile device and a remote computing system.
Figure 3A:
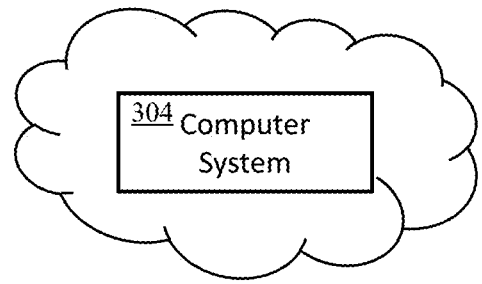
Figure 3B:
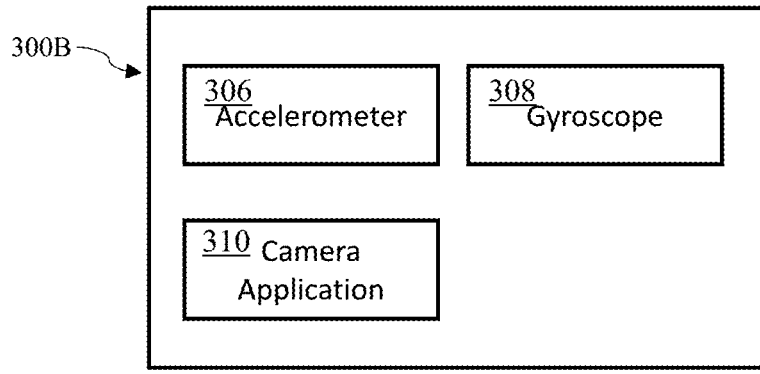

FIG. 3A illustrates the components of a mobile device 300A, according to one embodiment of the disclosure, where the computer system 302 is housed within the mobile device 300A. FIG. 3B illustrates the components of a mobile device 300B, according to another embodiment of the disclosure, where the computer system 302 is situated in a remote location, outside of the mobile device. Mobile device 300A and mobile device 300B are generically referred to as mobile device 300 (e.g., a mobile device that includes components 306, 308, 310, whether or not computer system is housed within mobile device 300 or is situated in a remote location relative to mobile device 300). The components 306, 308, 310 of FIG. 3B communicates to the remote computer system 304 via a network.

While the computer system receives the sequence of images in a time period, the computer system 302, 304 also monitors movement data of the mobile device within the time period. The movement data of the mobile device can be monitored using preexisting inertial sensors, such as an accelerometer 306 and a gyroscope 308, that are housed within the mobile device 300.

Figure 4:
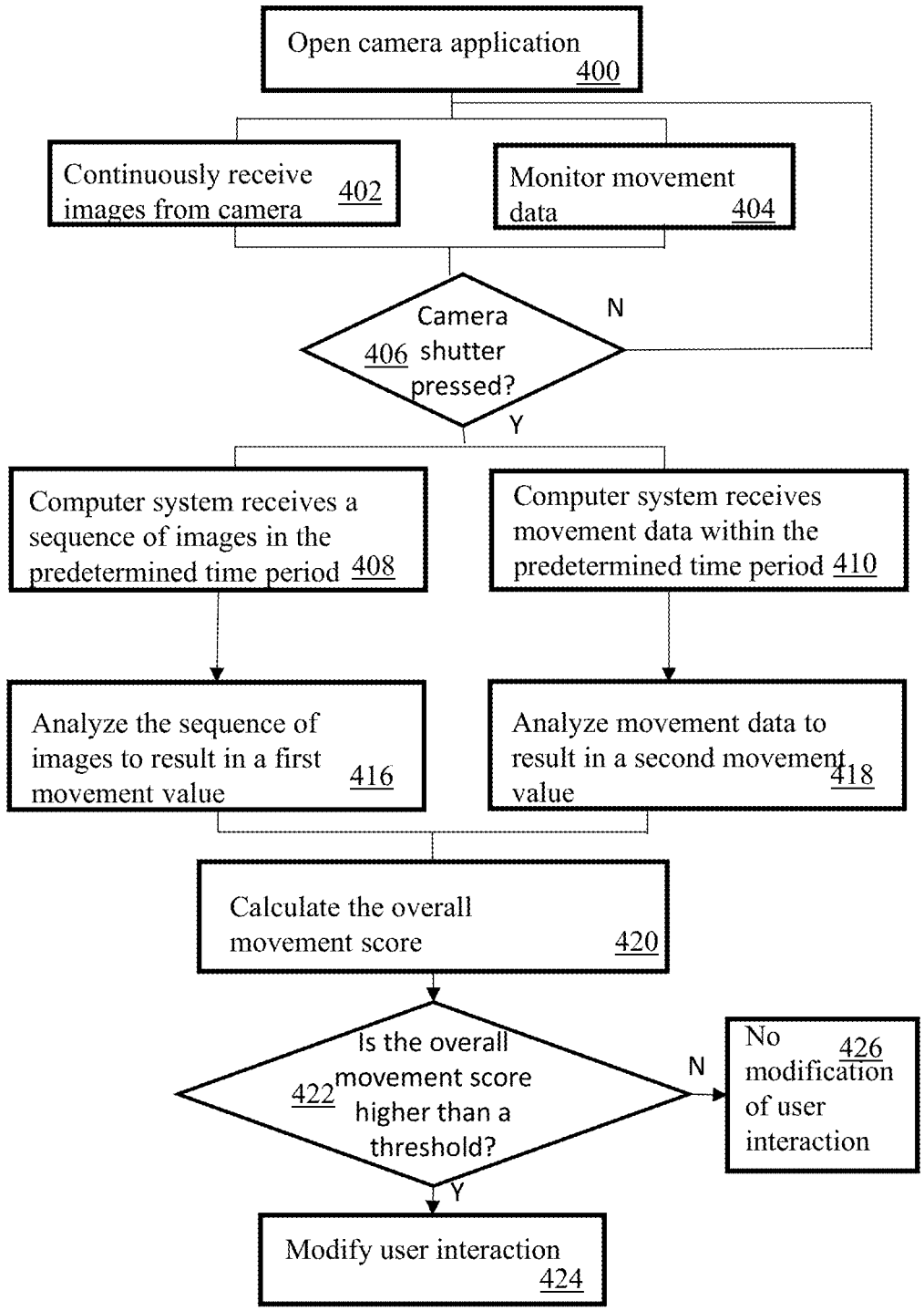
FIG. 4 is a block diagram illustrating an example method for modifying user interactions with a mobile device, in accordance with an embodiment of the disclosure.

FIG. 4 is a block diagram of an example embodiment of a method in accordance with the present disclosure. Once the user opens the camera application (e.g., camera application 310) at step 400, the computer system starts to continuously receive a collection of sequential images 200 from the camera application at step 402 and in conjunction, monitors movement data at step 404 using the preexisting inertial sensors, such as an accelerometer 306 and gyroscope 308. If the user presses the shutter button at step 406, the computer system receives at step 408 a sequence of images in the time period and also at step 410 receives movement data within the time period. The computer program analyses the sequence of images to result in a first movement value at step 416 and also analyses the movement data to result in a second movement value at step 418. The first and second movement values are used to calculate an overall movement score at step 420 of the user. If the movement score is higher than a threshold at step 422, then a modification is made to a subsequent interaction between the user and the mobile device interface at step 424. If the movement score is lower than the threshold, no modifications are made at step 426.

The analysis of the sequence of images at step 416 and the calculation of the first movement score can be done using existing techniques via an image movement and vibration analysis component in the computer system. One embodiment of the present disclosure uses object tracking. This technique detects pixel groups that follow a common feature and follows this structure along the sequence of images. The difference in the location of the pixel groups between each image frame is analyzed to calculate a movement value for the feature. This technique can be used to infer a first movement value of the mobile device in the time period.

Another embodiment of the present disclosure uses pixel analysis to analyze the sequence of images at step 416, which analyzes the difference in pixel values between two successive frames. This analysis is done on each pair of images in the sequence of images to result in a first movement value of the mobile device in the time period. Those skilled in the art will appreciate that there are various statistical and image processing techniques available to measure the first movement value of the mobile device from a sequence of images, such as the block-matching algorithm.

Another embodiment of the present disclosure focuses on the differences in the band of pixels around the edges of the sequence of images are analyzed, as opposed to every single pixel in each of the collection of images, to analyze the sequence of images and calculate the first movement value at step 416. Focusing on the band of pixels of the edges of images can prevent false positive calculations that indicate mobile device movement. For example, consider the scenario where the mobile device was being held still but a leaf moves in the camera's central field of view during the time period. Since the central pixels are ignored, the movement of the leaf will not have an impact on the calculation of the first movement value; the value which measures how much the mobile device had moved during the time period. Alternatively, in the scenario whereby a leaf, for example, appeared in the bottom left corner while the rest of the border pixels remained unchanged from one image to the next, it could be determined that the user's hand had not moved. Alternatively, if it was determined that other border pixels have changed from one image to the next, it could be determined that the user's hand had moved.

The analysis of the movement data and the calculation of the second movement value 418 can be done by using existing techniques for analyzing preexisting inertial sensor data. The movement data during the time period is monitored using the accelerometer 306 and gyroscope 308 devices housed within the mobile device. Accelerometer sensors are able to measure the acceleration of a device, as well as being able to detect the changes in the position of devices. Gyroscope sensors can measure the changes in orientation and angular velocity of a device in many degrees of freedom. The analysis of the movement of the mobile device is processed by the computer system, which uses existing techniques for inertial movement sensing and monitoring. These techniques use statistical methods to calculate the variation of the input data over the time period to result in a second movement value of the mobile device.

According to an embodiment of the disclosure, the calculation of the overall movement score of the mobile device takes into account both the first and second movement values calculated from the sequence of image and the movement data from the sensors. The overall movement score of the time period can then be calculated as a combination of the two movement values. There can be weighting factors and other statistical steps as part of the calculation. For example, a first movement value for a first time period (e.g., before a shutter activation) may be given a weighting twice as high as a second time period (e.g., after a shutter activation).

According to another embodiment of the present disclosure, the movement score is calculated using only one source; wherein only the sequence of images or the movement data is used to analyze and calculate the overall movement score. According to another embodiment, additional sources of data can be used to contribute to the calculation of the movement score. Those skilled in the art will appreciate that the overall movement score of the mobile device can be calculated by considering other sources of input data, such as data from additional wearable sensors from smart devices or using otherwise calculated user attributes concerning their motor abilities.

The movement score of the mobile device can be a numerical value that specifies the average linear movement in pixels (px) or millimeters (mm) of the mobile device. Alternatively, the movement score can be a numerical value that depicts the radius or circumference of the average movement area of the mobile device. Alternatively, the movement score can be a vector that captures the asymmetrical movement of the mobile device in multiple axes. Further alternative formats of the movement score can be used in the disclosure to modify the user interactions with the mobile device interface.

The movement score of the user may be calculated for the specific instance in time around where the user presses the shutter. The movement score can be used after the calculation to modify subsequent user interactions on the mobile device. An embodiment of the disclosure uses the movement score for a predefined period of time, e.g., 10 minutes after the movement score is calculated, to modify the user interactions. After the predefined period of time, the user interactions return back to normal and further interactions are not modified to accommodate the user.

According to another embodiment of the disclosure, the movement scores across a longer time period are stored and analyzed to identify trends or patterns in the motor abilities of the user. For example, if overtime, the movement score gets higher, this can indicate that the motor skills of the user are deteriorating. This could lead to a diagnosis of a motor impairment condition or be used in the monitoring of an existing condition. Additionally, the analysis of historical movement scores can reveal any unique user patterns of their condition. For example, the computer system may identify that once the user's hand shaking starts, it usually last 15 minutes but stop after that. Or as another example, the computer system may identify that the user only has hand shaking in the evening. Identifying personal user patterns of motor ability will improve the computer system's ability to modify the user interaction to better accommodate for the user's needs (e.g., by identifying times and/or situations in which a condition exists and/or becomes relatively more severe and then modifying an interaction only during these times and/or situations, and/or changing how this interactions are modified based on a predicted severity of the condition during that time and/or situation).

Figure 5:
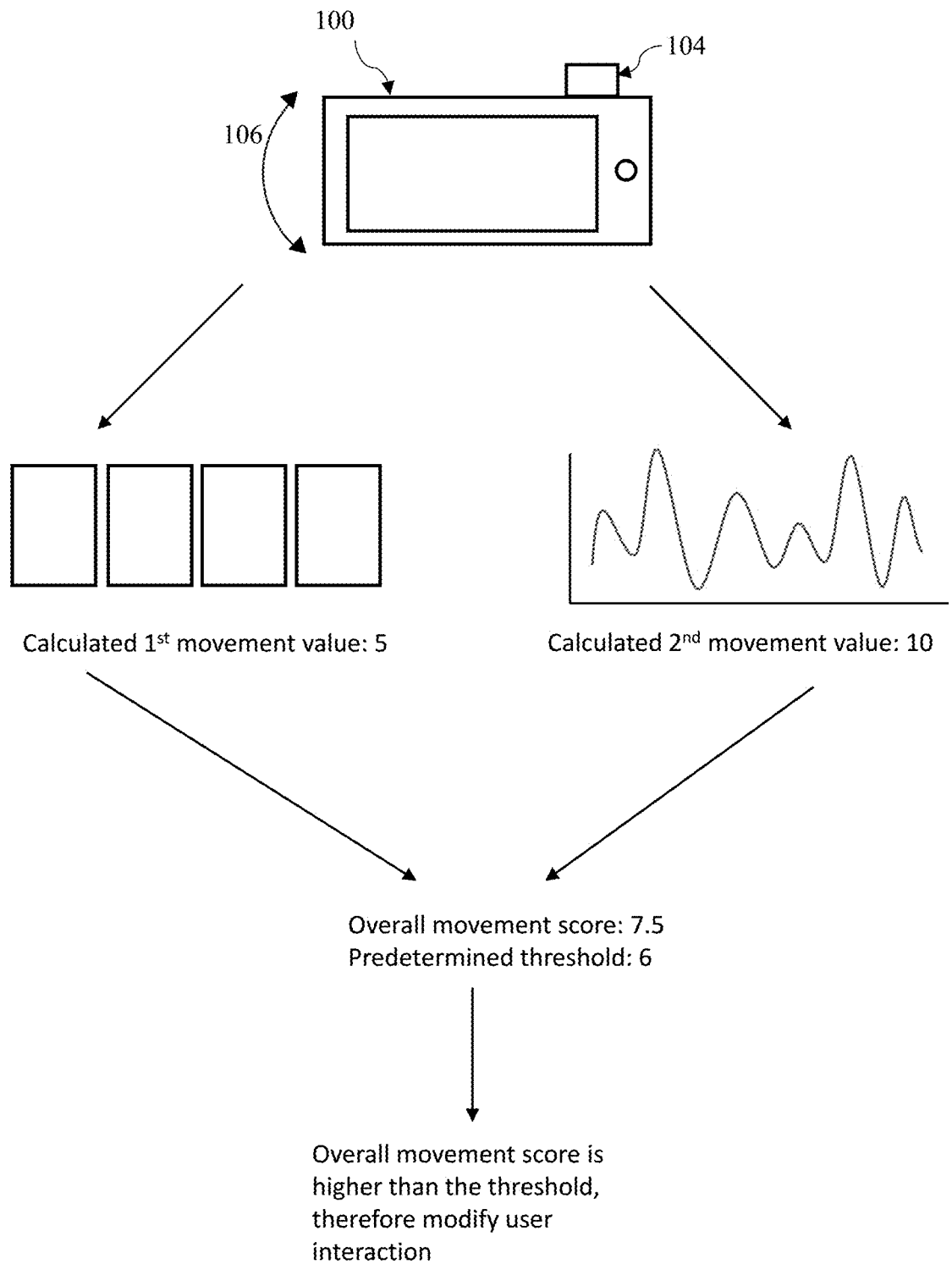
FIG. 5 shows an exemplary scenario of a user's hand movements resulting in the modification of the user's interaction with a mobile device.

FIG. 5 shows an exemplary scenario of how a user's hand movements 500 can be used to calculate the overall movement score as they are using a camera application to take a photo, which results in the modification of the user's interaction with a mobile device 502. Once the shutter is pressed, the collection of a sequence of images 504 and the movement data from the inertial sensors 506 are sent to the computer system. The first movement value 508 and the second movement value 510 are calculated by the computer system. The overall movement score is calculated (e.g., where a movement score is between a score of 0.0 indicating absolute stillness and a score of 10.0 indicating substantial movement, wherein in this case the movement score is calculated to be 7.5) and compared to the threshold value (e.g., 6). As the overall movement score is larger than the threshold value, the computer system will modify subsequent user interactions to compensate for the user's hand movements. If the overall movement score was below the threshold value, no modification will be made to the user's interactions since the overall movement score indicates that the user's hand movements are minimal.

Figure 6:
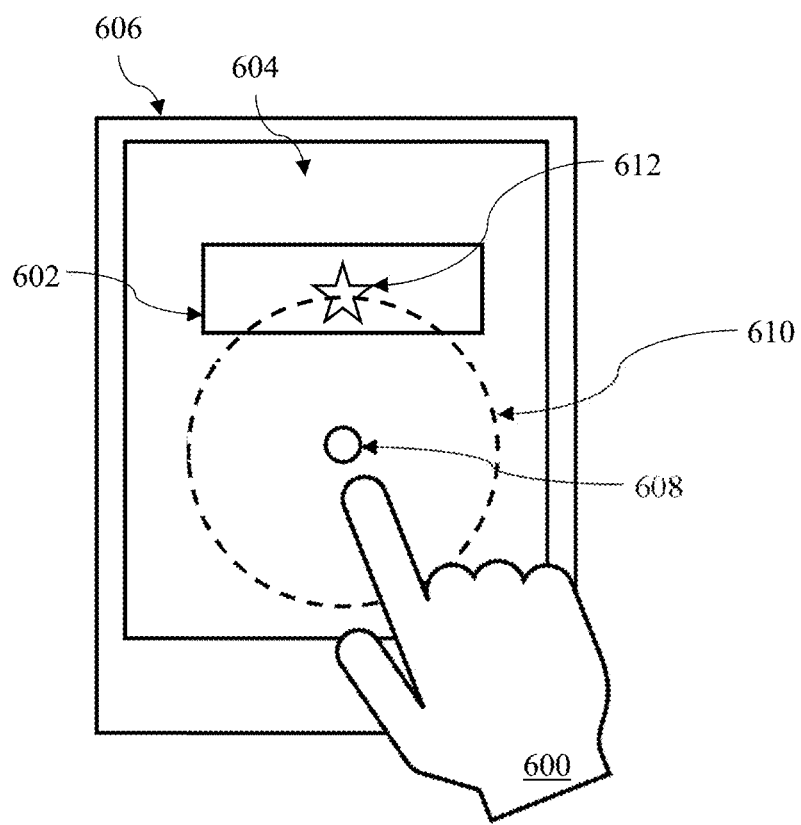
FIG. 6 is a diagram showing a calibration modification of the user interaction with the mobile device.

The modification of the user interaction with the mobile device allows the user to correctly interact with the mobile device interface, after the computer system calculates an overall movement score as the user uses the camera application. FIG. 6 illustrates an example of a modification of the user interaction by calibrating the user's input. The user 600 attempts to press the button 602 on the user interface 604 on the mobile device 606. Due to their motor skill impairments, the user accidently presses an alternative point 608 of the user interface 604. The alternative point is a non-clickable area so the user's interaction will usually not result in any action. The computer system takes into consideration the user's movement score 610; the movement score is depicted as a circular area around the user's interaction point. The system identifies any interactive elements within the circular area of the movement score and calibrates the user's interaction by modifying the input from the alternative point 608 to the correct point 612.

Figure 7A:
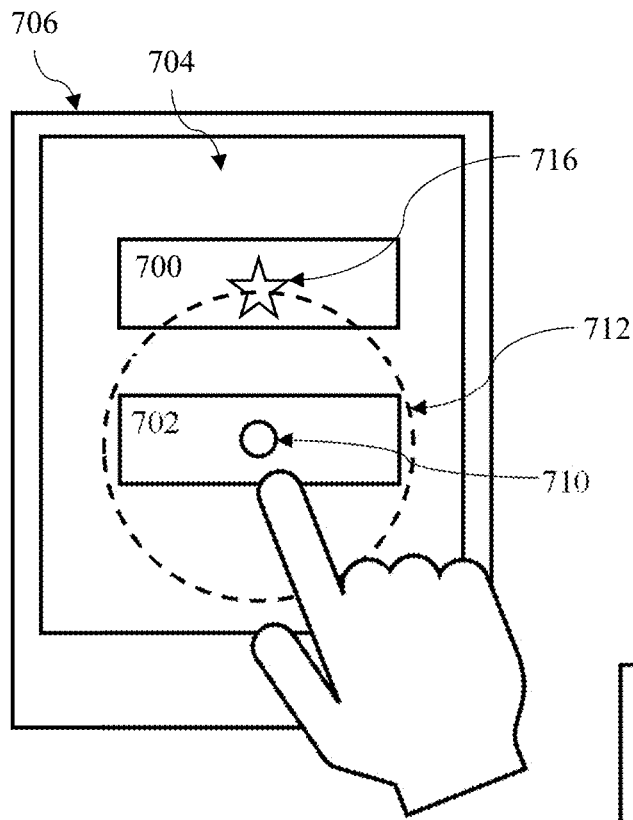
FIGS. 7A and 7B are diagrams showing a user interface modification of the user interaction with the mobile device.
Figure 7B:
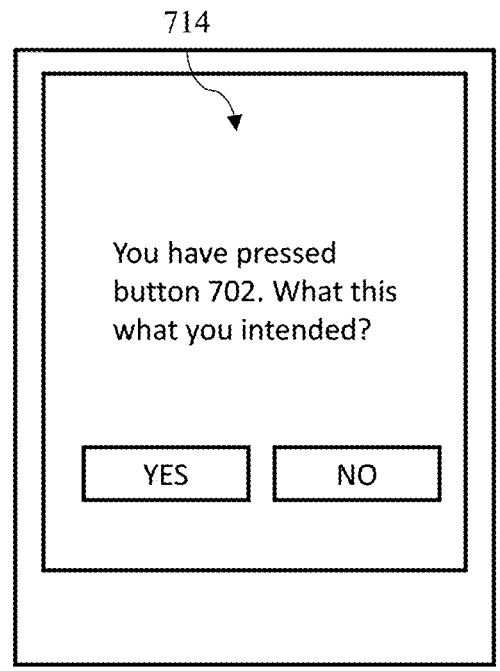

FIGS. 7A and 7B illustrate an alternative example of a modification of the user interaction by presenting additional checkpoints so the user interacts with the correct element on the mobile device interface. There are two buttons 700, 702 presented on the user interface 704 of the mobile device 706. The user 708 intends to press on the top button 700 but due to their motor impairments, accidently presses an alternative point 710 on the button 702 instead. The computer system takes into consideration the movement score 712 of the user; the movement score is depicted as a circular area around the user's interaction point. The computer system identifies any interactive elements within the circular area of the movement score and identifies that the user may have attempted to press either button. As illustrated in FIG. 7B, the computer system presents the user with an alert message, asking them to confirm which button they intended to press 714. Once the user confirms their intentions, the computer system will modify the user's interactions such that the alternative interaction point is not processed and rather, the correct point 716 is processed as an interaction instead.

The alert message can take different forms. In FIG. 7B, the user is presented with buttons to confirm their intentions. Alternatively, the user can be presented with an alternative message and input method, such as "Tap anywhere on the screen to confirm you meant to press the Button 2, otherwise, please wait 5 seconds and this dialog will disappear". Alternatively, the computer system may prompt the user to speak aloud their intention.

Another embodiment of the present disclosure may modify the user interactions with the mobile device by increasing the size of interactive elements while the computer system identifies the user has a high movement score.

Using the user's personal patterns of movement scores means that the various modifications of the user interface can be done in a dynamic fashion when it's required, as opposed to the user having to confirm their interactions their intentions every time they want to interact with the interface.

In another embodiment of the present disclosure, the movement scores of the user can be sent to a secondary device with a touch interface, such that the secondary device can modify the user interactions to accommodate the user's needs. For example, a first mobile device, such as a smartphone, can calculate the user's movement score through the camera application and the internal movement sensors. The user's movement score can then be sent to a second device, wherein the second device may be a mobile device or a stationary device with a touchscreen interface. The movement score is then used to modify the user interactions with the second device. In this way, a user's movement score alongside their movement patterns can be used to assist the user across multiple devices.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing system", "processing module", "processing circuit", "processor", and/or "processing unit" may be used interchangeably and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

Figure 8:
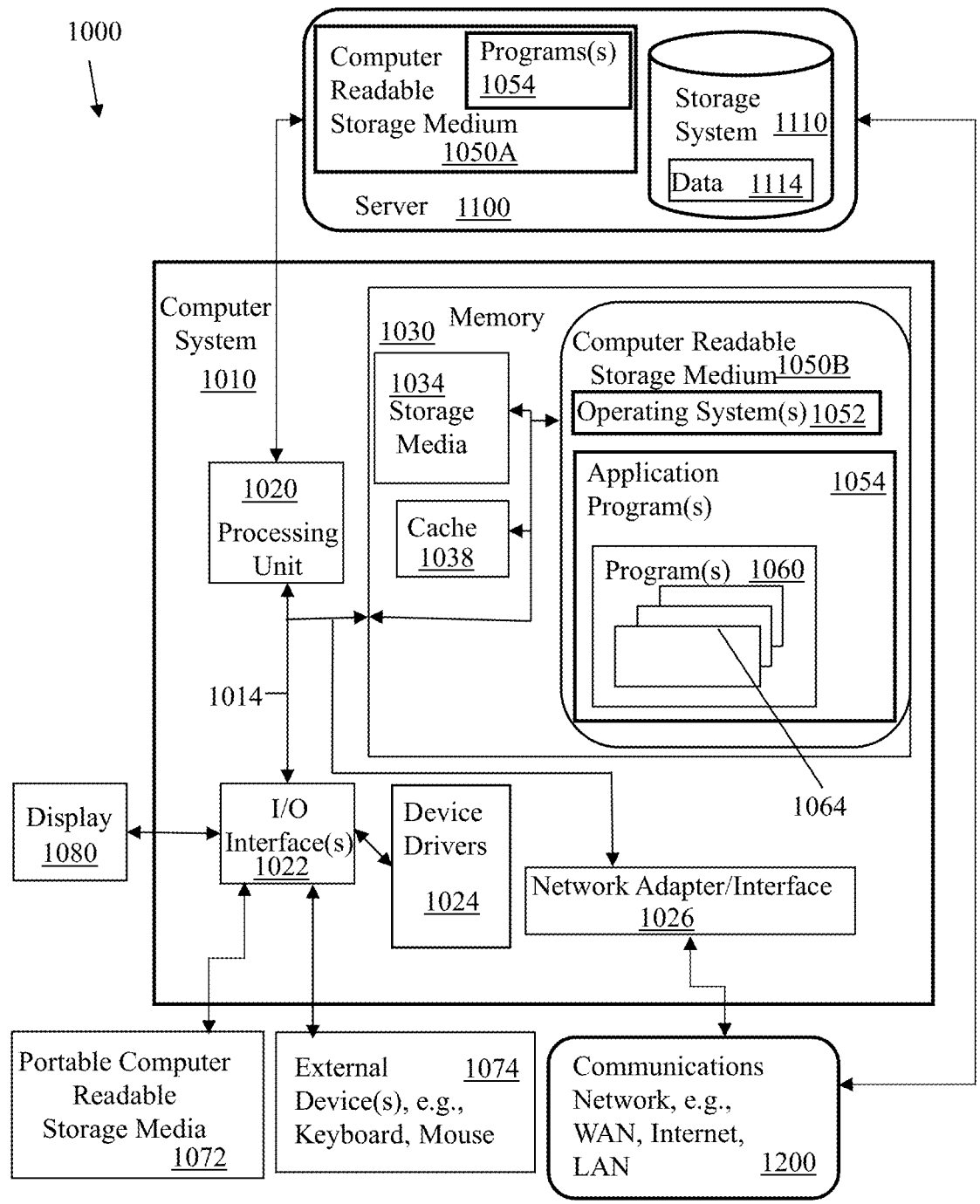
FIG. 8 is a block diagram depicting the hardware components of a system, for operating a gyroscopic haptic navigation device in accordance with an embodiment of the disclosure.
Figure 9:
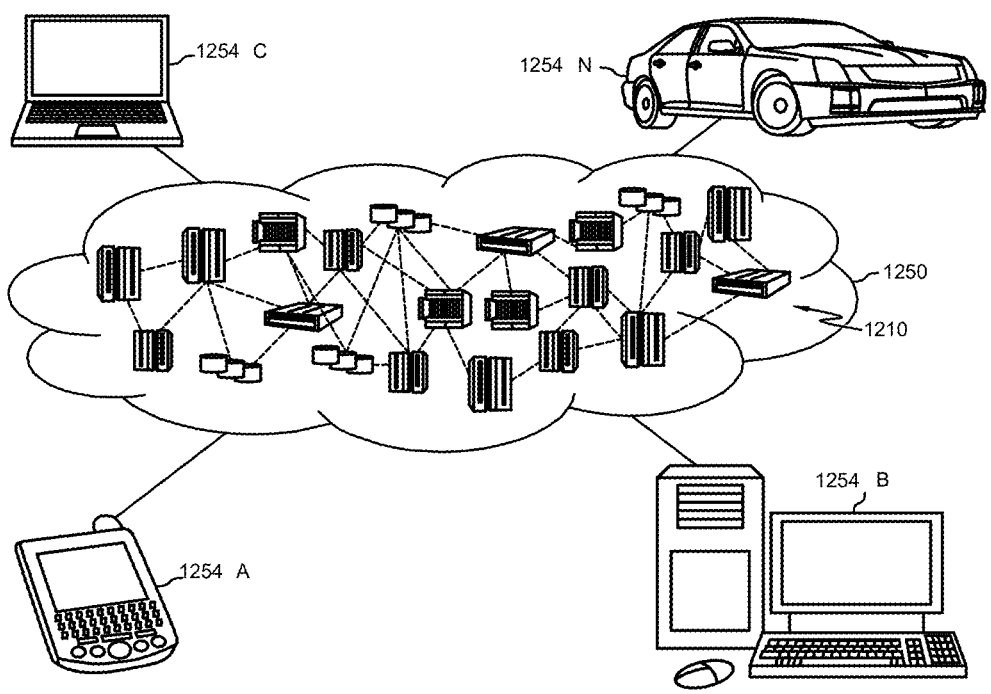
FIG. 9 is a functional block diagram depicting a cloud computing environment, in accordance with an embodiment of the disclosure.

The computer system 302, 304 may include internal and external hardware components, as described in further detail below with respect to FIG. 7. It should be appreciated that FIG. 7 provides only an illustration of one implementation and does not imply any limitations with regard to the environments in which different embodiments may be implemented. Many modifications to the depicted environment may be made. In other embodiments, the computer system 302, 304 may operate in a cloud computing environment, as depicted in FIGS. 8 and 9.

Referring to FIG. 7, a system 1000 includes a computer system or computer 1010 shown in the form of a generic computing device. The method of the present invention, for example, may be embodied in a program(s) 1060 embodied on a computer readable storage device, for example, generally referred to as memory 1030 and more specifically, one of computer readable storage medium 1050A (e.g., in a server 1100) or 1050B (e.g., in a memory 1030) as shown in FIG. 7. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 7 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 7 as program modules 1064. The program 1060 and program modules 1064 can execute specific steps, routines, sub-routines, instructions or code, of the program.

Embodiments of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 7, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050A, 1050B can be provided for reading from and writing to a non-removable, non-volatile magnetic media. The computer readable storage medium 1050A, 1050B can be embodied, for example, as a hard drive. Additional memory and data storage can be provided, for example, as the storage system (e.g., a database 1110) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method of the present invention, for example, may be embodied in one or more computer programs, generically referred to as a program 1060 and can be stored in memory 1030 in the computer readable storage medium 1050B. The program 1060 can include program modules 1064. The program modules 1064 can generally carry out functions and/or methodologies of embodiments of the invention as described herein. The program 1060 may be the camera application 310. The one or more programs 1060 are stored in memory 1030 and are executable by the processing unit 1020. By way of example, the memory 1030 may store an operating system 1052, one or more application programs 1054, other program modules, and program data on the computer readable storage medium 1050B. It is understood that the program 1060, and the operating system 1052 and the application program(s) 1054 stored on the computer readable storage medium 1050B are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically (e.g., autonomous and/or substantially immediate) without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 9 are intended to be illustrative only and that computing nodes 1210 and cloud computing environment 1250 can communicate with any type of computerized device over any type of network and/or network addressable connection (e.g., using a web browser).

Figure 10:
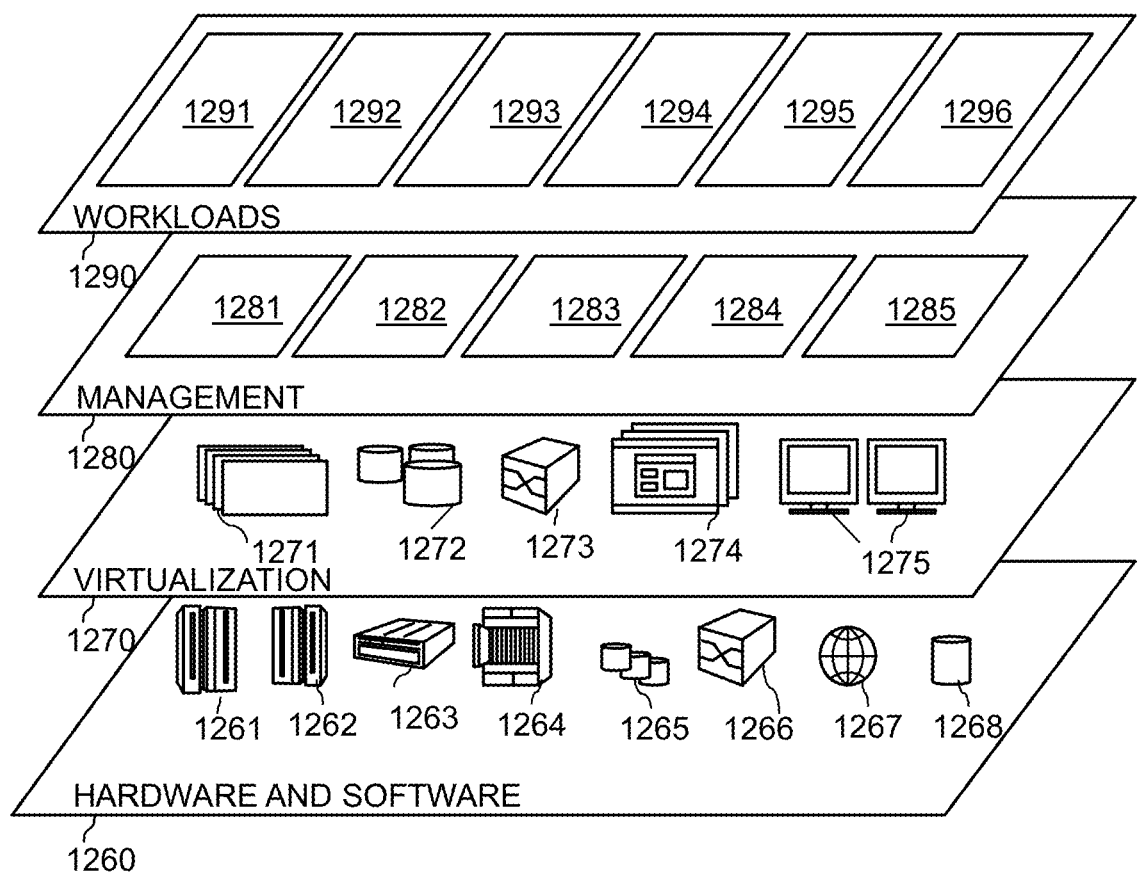
FIG. 10 is a diagram depicting abstraction model layers provided by the cloud computing environment of FIG. 9, in accordance with an embodiment of the disclosure.

Referring now to FIG. 10, a set of functional abstraction layers provided by cloud computing environment 1250 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include mapping and navigation 1291; software development and lifecycle management 1292; virtual classroom education delivery 1293; data analytics processing 1294; transaction processing 1295; and assessing conditions and recommending modifications 1296.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising: receiving, by a computer system, a sequence of image frames in a time period, from a camera application on a mobile device, wherein the time period starts before and ends after a shutter is activated on the camera application;
   analyzing differences in pixel values between successive frames in the sequence of image frames;
   monitoring, by the computer system based on the analyzing, movement of the mobile device within the time period;
   calculating a movement score fora user of the mobile device, by analyzing the sequence of image frames and the movement of the mobile device;
   analyzing the movement score and historical movement scores for movement patterns associated with motor skill impairment related to a known condition; and
   modifying, based on the movement patterns, an interaction for the user with an interface on the mobile device.

2. The method of claim 1, further comprising capturing and caching a collection of images when the camera application is open in anticipation of the shutter being pressed on the camera application, wherein the sequence of image frames is selected from the cached collection of images.

3. The method of claim 1, wherein the computer system is located within the mobile device.

4. The method of claim 1, wherein the computer system is located on a remote server linked to the mobile device by a network.

5. The method of claim 1, wherein the analyzing the image frames includes calculating an amount of movement and vibration of the image frames.

6. The method of claim 1, wherein the monitoring the movement is collected by internal movement sensors, within the mobile device.

7. The method of claim 1, further comprising comparing the calculated movement score against a threshold value to determine whether the user has a motor impairment.

8. The method of claim 7, wherein the analyzing the movement score and historical movement scores for movement patterns comprises calibrating a user input in response to a movement score higher than a threshold.

9. The method of claim 7, wherein the analyzing the movement score and historical movement scores for movement patterns comprises presenting the user with additional alerts, in response to a user interaction, to confirm the intention of the user's interaction.

10. The method of claim 7, wherein the analyzing the movement score and historical movement scores for movement patterns comprises changing a size of user interaction elements on a mobile device interface in response to a movement score higher than a threshold.

11. A computer program product comprising a computer readable storage medium having program instructions embodied therewith, the program instructions executable by a processor to cause the processors to perform a method, the method comprising:
   receiving, by a computer system, a sequence of image frames in a time period, from a camera application on a mobile device, wherein the time period starts before and ends after a shutter is activated on the camera application;
   analyzing differences in pixel values between successive frames in the sequence of image frames;
   monitoring, by the computer system based on the analyzing, movement of the mobile device within the time period;
   calculating a movement score fora user of the mobile device, by analyzing the sequence of image frames and the movement of the mobile device;
   analyzing the movement score and historical movement scores for movement patterns associated with motor skill impairment related to a known condition; and
   modifying, based on the movement patterns, an interaction for the user with an interface on the mobile device.

12. The computer program product of claim 11, further comprising capturing and caching a collection of images when the camera application is open in anticipation of the shutter being pressed on the camera application, wherein the sequence of image frames is selected from the cached collection of images.

13. The computer program product of claim 11, wherein the computer system is located within the mobile device.

14. The computer program product of claim 11, wherein the analyzing the image frames includes calculating an amount of movement and vibration of the image frames.

15. The computer program product of claim 11, wherein the monitoring the movement is collected by internal movement sensors, within the mobile device.

16. The computer program product of claim 11, further comprising comparing the calculated movement score against a threshold value to determine whether the user has a motor impairment.

17. The computer program product of claim 16, wherein the analyzing the movement score and historical movement scores for movement patterns comprises calibrating a user input in response to a movement score higher than a threshold.

18. The computer program product of claim 16, wherein the analyzing the movement score and historical movement scores for movement patterns comprises changing a size of user interaction elements on the mobile device interface in response to a movement score higher than a threshold.

19. A system comprising: a memory storing program instructions;
and a processor in communication with the memory, the processor being configured to execute the program instructions to perform processes comprising:
   receiving, by a computer system, a sequence of image frames in a time period, from a camera application on a mobile device, wherein the time period starts before and ends after a shutter is activated on the camera application;
   analyzing differences in pixel values between successive frames in the sequence of image frames;
   monitoring, by the computer system based on the analyzing, movement of the mobile device within the time period;
   calculating a movement score fora user of the mobile device, by analyzing the sequence of image frames and the movement of the mobile device;
   analyzing the movement score and historical movement scores for movement patterns associated with motor skill impairment related to a known condition; and
   modifying, based on the movement patterns, an interaction for the user with an interface on the mobile device.

* * * * *